Patented May 3, 1927.

1,626,848

UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

PROCESS FOR THE MANUFACTURE OF HYDROCYANIC ACID.

No Drawing.   Application filed June 24, 1924.   Serial No. 721,994.

The invention refers to the manufacture of hydrocyanic acid by the interaction of gaseous nitrogen compounds for example ammonia and gaseous carbon compounds for example carbon monoxide or of gas mixtures containing such compounds in the presence of catalysts or contact bodies at elevated temperatures. Hitherto metals or metal compounds such as metal oxides have been used in these processes.

Now, I have found, that activated charcoal is an excellent catalyst for the production of hydrocyanic acid. Activated charcoal can be used either alone or in conjunction with other indifferent or catalytically acting substances.

When activated carbons of different origin were used as catalysts it was noticed that their catalytical action varied to an extraordinary degree. At first it was quite impossible to account for this difference.

The reason however could at last be established by a long series of experiments carried out with great care and exactitude: Acid activated charcoals yield comparatively small quantites of hydrocyanic acid, neutral activated carbons gave better yields, whilst the best yields of hydrocyanic acid were obtained from alkaline activated carbons. By acid activated carbons such carbons are understood as being capable of consuming alkalis by chemical reaction; by alkaline activated charcoals, such as being capable of consuming acids by chemical reaction, whilst by neutral such carbons are meant as are incapable of combining either with acids or with alkalis by chemical reaction. The particular catalytic action of alkaline activated carbons can be caused by the presence of soluble or insoluble substances of an alkaline nature.

Further, it was found that the catalytical efficiency of activated charcoal showing alkaline reaction may be further enhanced by increasing its alkalinity by treatment with substances of alkaline action. In the same way neutral or acid activated carbons can be converted into alkaline catalysts of very high efficiency. The alkalization or the enhancement of the alkalinity respectively may be effected in the simplest manner by impregnating the activated carbon with substances such as alkali or alkaline earth metal hydroxides, carbonates, silicates, borates, phosphates, cyanides, sulphides etc. The impregnation may for example be carried out by treating the activated charcoals with solutions or suspensions of such alkaline substances and drying them afterwards.

In place of or in addition to, the above named substances such compounds or substances may be used as are capable of being transformed into alkaline substances either by previous treatment or during the manufacturing process for example sulfates, nitrates, formates, acetates of alkali or alkaline earth metals.

Furthermore, it was found, that in place of or in addition to activated charcoal other porous charcoals such as charcoal derived from beet vinasse, wood-charcoal and the like can also be used as catalysts for the production of hydrocyanic acid. For the application of such charcoals or substances containing carbonaceous material the same holds good as has been said in reference to activated carbon. Acid charcoals have to be avoided; neutral carbons show a better result, whilst here, too, the best results are achieved with alkaline charcoals or charcoals made alkaline or carbons, the alkalinity of which has been increased. It has been suggested previously to pass mixtures of carbon monoxide and ammonia at very high temperatures, for example of 1800–2000° C. over wood charcoal. In this well known process the wood charcoal supplies the carbon for the hydrocyanic acid, being consumed thereby at the high temperatures utilized. In the present invention however charcoals of a clearly defined character, i. e. neutral or alkaline charcoals, are used as catalysts at temperatures at which a consumption of the charcoal does not take place.

The manufacture of the hydrocyanic acid according to this invention may be carried out at ordinary, at increased and also at decreased pressure. The components of the reaction, for example carbon monoxide and ammonia may be used either alone or in mixture with other gases such as nitrogen, hydrogen etc. The temperatures depend upon the composition of the gas, its rate of flow and the nature of the catalysts utilized. In general the working temperatures are between 400 and 800° C. The carbonaceous catalysts can be applied either by themselves or in conjunction with other substances of an inert or of a catalytical nature such as metallic oxides, this being effected for example by mixing them or for example by depositing the carbon catalysts on supporting material or in such a way that the carbon itself is for example impregnated or coated with other substances acting as catalysts. The carbonaceous contact substances can also be prepared from carbonizable material in the course of producing the hydrocyanic acid, preferably in such a way that they are alkalized at the same time. Suitable starting materials for the preparation of carbonaceous contact substances are for example wood, cellulose, alkali or alkaline earth metals salts of high-molecular fatty acids and the like. The impregnation with substances with alkaline reaction or substances capable of being converted into such material may be effected during or after the carbonization as the case may be.

What I claim is:

1. Process for the manufacture of hydrocyanic acid which consists in reacting carbon monoxide with ammonia by passing a mixture of these in contact with a catalyst comprising a porous non-acid charcoal while maintaining a reaction temperature between 400° C and 800° C.

2. Process for the manufacture of hydrocyanic acid which consists in reacting carbon monoxide with ammonia by passing a mixture of these in contact with a catalyst comprising an alkaline charcoal while maintaining a reaction temperature between 400° C and 800° C.

3. Process for the manufacture of hydrocyanic acid which consists in reacting carbon monoxide with ammonia by passing a mixture of these in contact with a catalyst comprising an alkaline activated charcoal while maintaining a reaction temperature between 400° C and 800° C.

4. Process for the manufacture of hydrocyanic acid which consists in reacting carbon monoxide with ammonia by passing a mixture of these in contact with a catalyst comprising a porous charcoal containing a small amount of an alkaline salt while maintaining a reaction temperature between 400° C and 800° C.

5. Process for the manufacture of hydrocyanic acid by the interaction of carbon monoxide and ammonia at elevated temperature in the presence of a porous charcoal catalyst formed by carbonizing carbonaceous matter in the reaction vessel in an atmosphere of the reacting gases.

6. Process for the manufacture of hydrocyanic acid by the interaction of carbon monoxide and ammonia at elevated temperature in the presence of a porous charcoal catalyst formed by carbonizing carbonaceous matter in the reaction vessel in an atmosphere of carbon monoxide and ammonia.

7. Process for the manufacture of hydrocyanic acid by the interaction of carbon monoxide and ammonia at elevated temperature in the presence of a porous charcoal catalyst formed by carbonizing carbonaceous matter in the reaction vessel in an atmosphere of the reacting gases and in the presence of a small amount of an alkaline salt.

8. Catalyst for the reaction of carbon monoxide with ammonia to form hydrocyanic acid comprising a carbonized body formed by carbonizing carbonaceoue material in the presence of carbon monoxide and ammonia.

9. Catalyst for the reaction of carbon monoxide with ammonia to form hydrocyanic acid comprising a carbonized body formed by carbonizing carbonaceous material in the presence of carbon monoxide and ammonia and in the presence of an alkaline salt.

In testimony whereof I have signed my name to this specification.

OTTO LIEBKNECHT.